United States Patent
Wroblewski et al.

(10) Patent No.: US 9,664,400 B2
(45) Date of Patent: May 30, 2017

(54) AUTOMATED TECHNIQUE OF MEASURING ROOM AIR CHANGE RATES IN HVAC SYSTEM

(71) Applicant: Trustees of Boston University, Boston, MA (US)

(72) Inventors: Donald Wroblewski, San Francisco, CA (US); Michael Gevelber, Auburndale, MA (US); Paul D. Gallagher, Brookline, MA (US)

(73) Assignee: Trustees of Boston University, Boston, MA (US)

( * ) Notice: Subject to any disclaimer, the term of this patent is extended or adjusted under 35 U.S.C. 154(b) by 479 days.

(21) Appl. No.: 14/353,953

(22) PCT Filed: Nov. 19, 2012

(86) PCT No.: PCT/US2012/065786
§ 371 (c)(1),
(2) Date: Apr. 24, 2014

(87) PCT Pub. No.: WO2013/075080
PCT Pub. Date: May 23, 2013

(65) Prior Publication Data
US 2014/0303789 A1    Oct. 9, 2014

Related U.S. Application Data

(60) Provisional application No. 61/561,131, filed on Nov. 17, 2011.

(51) Int. Cl.
*G05B 21/00* (2006.01)
*G05D 23/00* (2006.01)
(Continued)

(52) U.S. Cl.
CPC ...... *F24F 11/0009* (2013.01); *F24F 11/0086* (2013.01); *F24F 3/0442* (2013.01);
(Continued)

(58) Field of Classification Search
None
See application file for complete search history.

(56) References Cited

U.S. PATENT DOCUMENTS 4,500,034 A * 2/1985 Reese .................... F24F 11/053
165/205
4,830,274 A    5/1989 Johnson et al.
(Continued)

OTHER PUBLICATIONS

International Search Report for International Application No. PCT/US/065786, dated Mar. 27, 2013.

*Primary Examiner* — Wissam Rashid
(74) *Attorney, Agent, or Firm* — BainwoodHuang

(57) ABSTRACT

An HVAC system employs a technique built around a system identification/modeling method that determines critical building loads and airflows experimentally without relying on design plans or statistical modeling approaches. Operation includes observing the dynamic response of individual room temperature, in response to a change of inlet air flow conditions (either air flow rate and/or supply air temperature). This empirically-based model enables development of an optimized control approach that minimizes conditioned airflow while meeting required ventilation, thermal, and humidification performance objectives. Building-wide performance is achieved by aggregating empirically determined room-level loads, thus ensuring that the coupled performance objectives can be achieved while minimizing energy use for every space within a building.

17 Claims, 3 Drawing Sheets

(51) Int. Cl.
*F24F 11/00* (2006.01)
*F24F 3/044* (2006.01)

(52) U.S. Cl.
CPC ............... *F24F 2011/0038* (2013.01); *F24F 2011/0091* (2013.01); *Y02B 30/767* (2013.01)

(56) References Cited

U.S. PATENT DOCUMENTS

| | | | |
|---|---|---|---|
| 5,212,983 A * | 5/1993 | Ott | G01F 1/6842 |
| | | | 73/204.14 |
| 5,579,993 A | 12/1996 | Ahmed et al. | |
| 5,605,280 A | 2/1997 | Hartman | |
| 6,581,847 B2 | 6/2003 | Kline et al. | |
| 6,699,120 B1 | 3/2004 | Darum | |
| 2005/0087616 A1* | 4/2005 | Attridge | F24F 3/044 |
| | | | 236/91 D |
| 2005/0279035 A1* | 12/2005 | Donovan | E04B 1/348 |
| | | | 52/79.1 |
| 2006/0144057 A1* | 7/2006 | You | F25B 49/005 |
| | | | 62/126 |
| 2009/0001179 A1 | 1/2009 | Dempsey | |
| 2009/0216380 A1 | 8/2009 | Kolk | |
| 2010/0163633 A1 | 7/2010 | Barrett et al. | |
| 2010/0286957 A1 | 11/2010 | Rock et al. | |
| 2013/0030575 A1* | 1/2013 | Dempsey | F24F 11/001 |
| | | | 700/276 |

* cited by examiner

AUTOMATED TECHNIQUE OF MEASURING ROOM AIR CHANGE RATES IN HVAC SYSTEM

BACKGROUND

Heating, ventilation and air conditioning (HVAC) systems can account for a large fraction, e.g. 50 to 70%, of the energy use of a building, and the amount and cost of energy used by HVAC systems scales strongly with air flow (characterized by "air change rate" (ACR) or "air changes per hour" (ACH) for rooms, as well as cubic feet per minute (CFM) for actual air flow rates). The reason for this strong correlation is that in many buildings, room temperature control is achieved by modulating conditioned air flow. In many older buildings, designed when energy was cheap, design engineers found it easy to meet the multiple objectives of desired temperature and humidity levels and healthy fresh air ventilation requirements by using high airflow rates, which entailed high energy use for HVAC. However, from a sustainability viewpoint these high air flows (quantified in terms of the overall ACH of the building) are costly, not only due to the thermal energy used to heat the air and electricity used for cooling, but also the large electricity demand from the supply and return fans used to move the air around the building.

Known models of HVAC systems are used for a variety of purposes. There are two general classes of building HVAC modeling approaches: forward modeling driven by detailed data on building and occupancy characteristics and climate conditions; and inverse modeling based on System Identification (SI) and driven by actual building performance. Building simulations based on forward modeling are most beneficial when used for parametric studies during the design phase, but they require very detailed building and equipment characteristics as inputs. Forward models are difficult to use to determine actual air flow rates since typically they are based on assumed air flow rates. They are often poor predictors of actual building energy use because of changes to the equipment performance, occupancy and usage patterns that are difficult to predict during the design phase. DOE-2 and EQUEST, Trnsys, TRACE, BLAST, and the newer EnergyPlus are examples of commercial software that can be used for building HVAC system analysis. Inverse models are often simpler than detailed building simulations, and are most useful in existing buildings with Energy Management Systems, and can be predictors of future energy in a statistical sense. However, they do not typical use internal physical variables that are important to know in order to improve HVAC system performance.

SUMMARY

One drawback of current building HVAC improvement approaches is that they do not explicitly identify the critical variable of air flows for each variable air volume (VAV) box throughout the building from the available data, nor are they well suited to be used in conducting a step response experiment to identify these critical values. This shortcoming is addressed by the presently disclosed technique.

A new approach is disclosed for optimizing the operating conditions, settings, and control of building HVAC systems with the goal of significantly reducing HVAC energy use as well as providing a framework to diagnose building HVAC problems. It focuses on existing buildings, which were designed during a time when energy was cheap, so their HVAC systems were not optimized to minimize energy use while meeting the ventilation and comfort objectives. However, this technology is also applicable for new buildings in terms of aiding in building commissioning, monitoring operations, and diagnosing problems. The disclosed technique determines actual flow rates and thermal loads on a room-by-room basis by making changes to room air flow rates and measuring the room temperature response. The technique can be used even where a single VAV box serves multiple rooms, as long as each room has a measured temperature. The information obtained can be used to re-optimize HVAC system and control settings to meet combined ventilation, humidity, and thermal performance objectives.

The disclosed approach is built around a system identification/modeling method that determines critical building loads and airflows experimentally without relying on design plans or statistical modeling approaches. These experiments are conducted by observing the dynamic response of individual room temperatures, in response to a change of inlet air flow conditions (either air flow rate and/or temperature). This empirically-based model enables development of an optimized approach that minimizes conditioned airflow while meeting the required ventilation, thermal, and humidification performance objectives. Building-wide performance is achieved by aggregating empirically determined room-level loads, thus ensuring that the coupled performance objectives can be achieved while minimizing energy use for every space within a building.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The core engine of the disclosed process is a room-by-room system identification (SI) model, a unique model that combines the physics-based approaches of large, whole building models such as DOE-2, with the simplicity and empirical nature of stochastic-based SI methods. This model is used to determine room-level Air Change Rates (ACR), supply air flow rates, time constants, and thermal loads from transient temperature responses following step changes in air flow rates and/or changes in room supply temperature. Once the ACR and loads are known, they can be compared with minimum ventilation needs to provide a basis for rebalancing the system for reduced energy savings. Note that the ACR values described below are the total airflow rates into the rooms; these must be modified by the fraction of outside ventilation air supplied by the system (obtainable from the building automation system) to determine the actual fresh air ventilation rates in each room.

Figure 1:
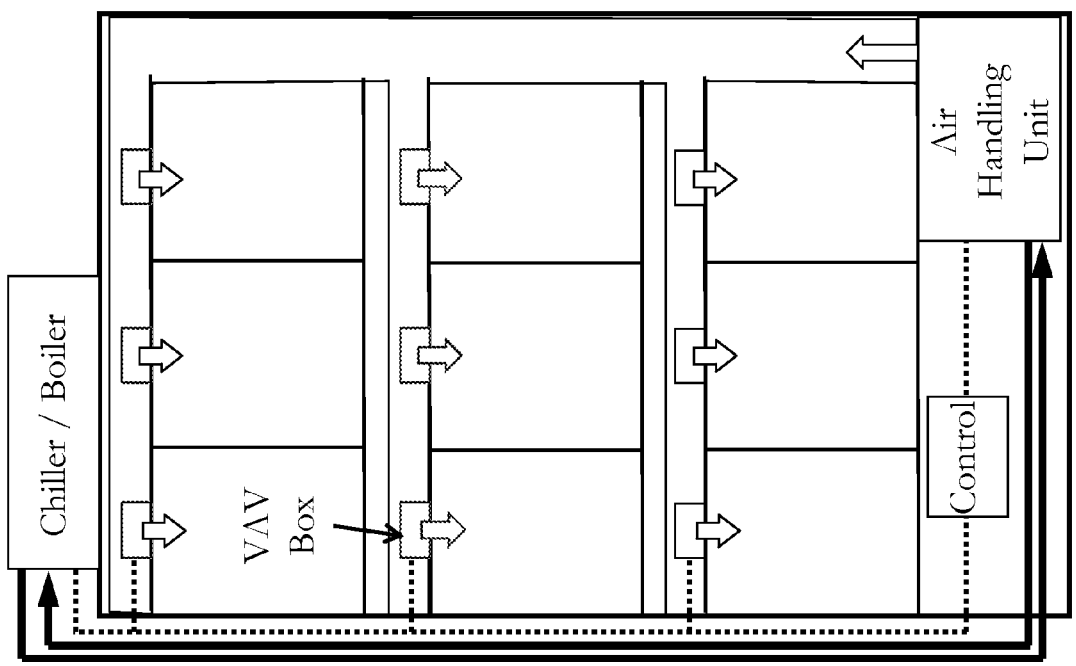
FIG. 1 is a schematic diagram of an HVAC system in a building.

FIG. 1 shows a simplified schematic of a building HVAC system, which may utilize variable air volume (VAV) boxes. This system and its operation are described in more detail below.

Figure 2:
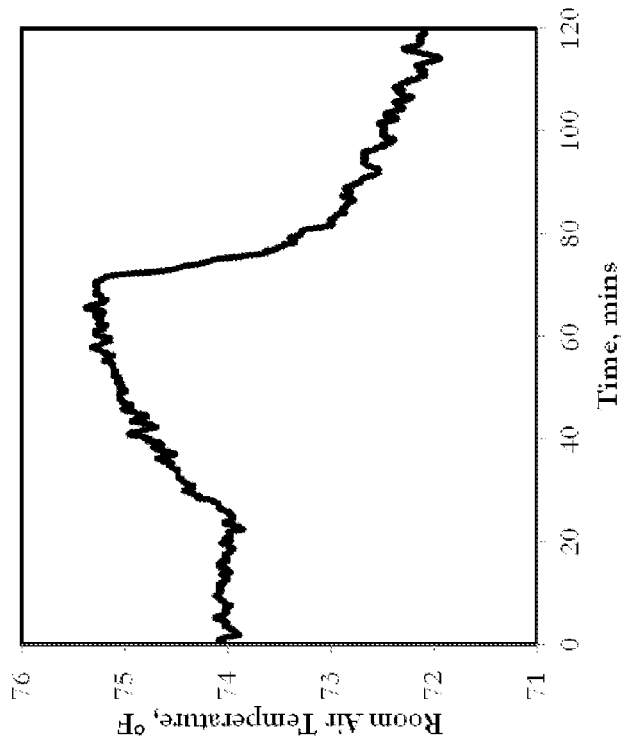
FIG. 2 is a waveform diagram of a temperature response to change in air flow rate.

FIG. 2 shows an example of a transient room temperature response to step-like changes in air flow. This response function can be used as an input to a system identification system/process to determine ACR, as described more fully below.

Figures 3, 4:
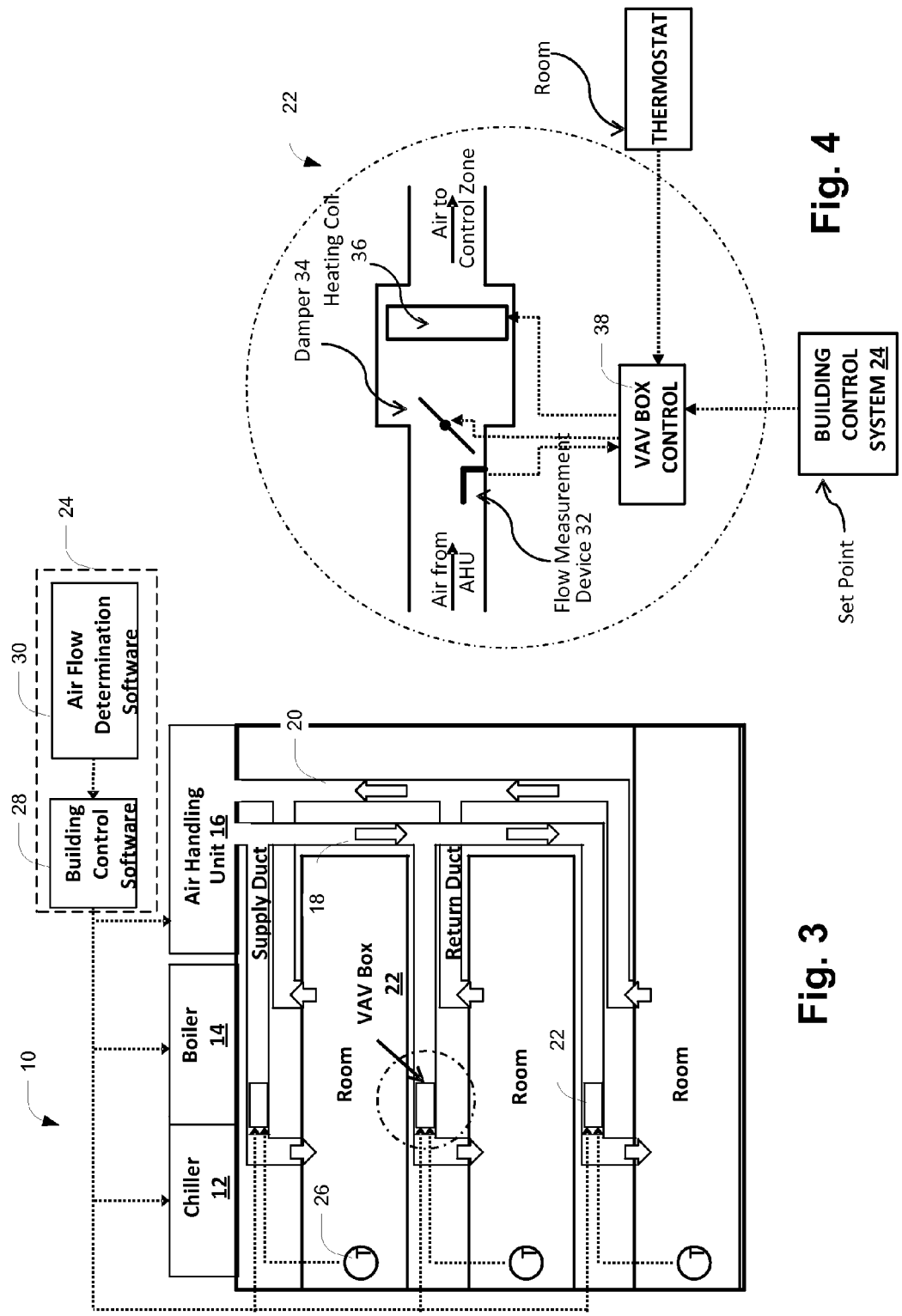
FIG. 3 is a schematic diagram of an HVAC system in a building.
FIG. 4 is a schematic diagram of a variable air volume (VAV) unit.

FIG. 3 shows the system structure, i.e., the structure of a multiple-room building 10 including its HVAC system. The system includes a chiller 12, boiler 14 and air handling unit (or air handler) 16. The chiller 12 provides cold water to cooling coil(s) in the air handler 16 (described below), and the boiler 14 provides hot water to heating coil(s) in the air handler 16 (described below). The air handler 16 is connected to supply duct 18 and return or exhaust duct 20, each of which is connected to one or more rooms or other air-conditioned spaces of the building 10 (here "air-conditioned" refers to heating and/or cooling). At the supply entrance to each room (or in some cases group of rooms) is a variable air volume (VAV) box 22, each receiving input signals from a building control system 24 and from a local thermostat (T) 26. The building control system 24 is typically implemented using one or more computers that include processing circuitry operative to store and execute computer program instructions of building control software 28 and air flow determination software 30. As generally known in the art, such processing circuitry may include one or more processors, memory, input/output interface circuitry, and interconnect circuitry such as one or more high-speed data buses that interconnect these components together for data transfer therebetween. The various devices receiving control inputs from the control system 24 (e.g., chiller 12, boiler 14, air handler 16, VAV boxes 22) are also referred to as "controlled elements" herein.

FIG. 4 shows a VAV box 22 as including a flow measurement device 32, a damper 34, a heating coil 36, and a local VAV box controller 38. The flow measurement device 32 provides a signal indicative of a rate of air flow through the VAV box 22, which is based in part on the position of the damper 34 as controlled by the VAV box controller 38. The heating coil 36 is used as a local adjunct to the heating provided by the boiler 14 to maintain a desired temperature of the room.

Figure 5:
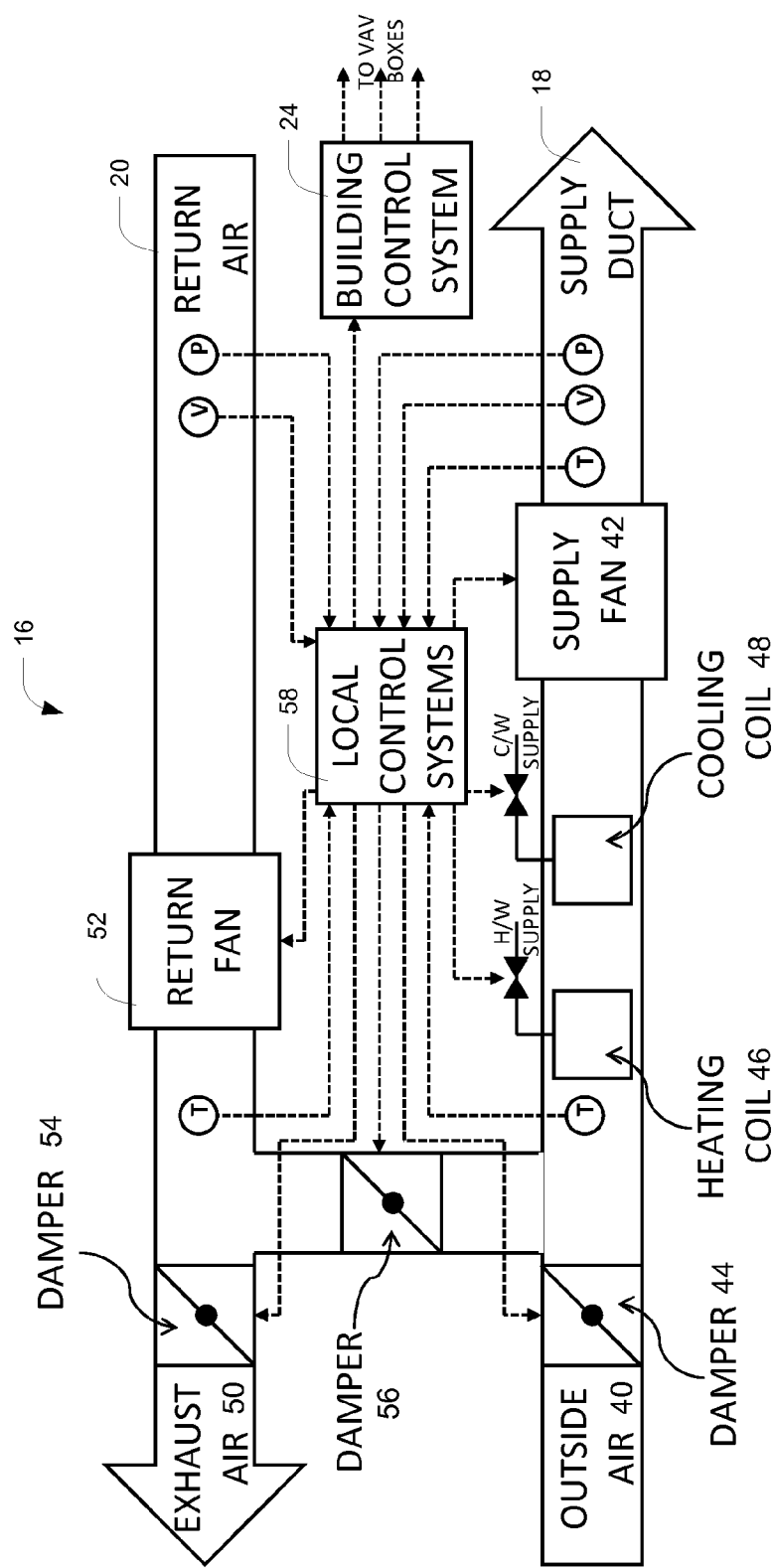
FIG. 5 is a schematic diagram of an air handling unit.

FIG. 5 shows details of the air handler 16. Outside air is obtained at an intake port 40 by action of a supply fan 42 via an input damper 44. Supply air is fed into the supply duct 18 through a heating coil 46 and cooling coil 48, fed by the boiler 14 and chiller 12 (FIG. 3) respectively. Return air from the return duct 20 is exhausted at an exhaust port 50 by action of a return fan 52 and damper 54. A recirculating damper 56 provides for a selectable level of recirculation. The various devices are under control of one or more local control systems 58, which also receive input signals from various temperature sensors (T), pressure sensors (P) and flow sensors (V).

As previously mentioned, the disclosed approach involves operation of the HVAC system which includes use of a system identification (SI) model. The SI model may be based on a thermally-lumped response of the room air temperature to changes in air flow rates and/or supply air temperature, as given by the equation:

$$\frac{dT}{dt} = ACR(T_S - T) + \frac{Q_I}{C} + \frac{T_W - T}{RC} \tag{1}$$

in which T is the room air temperature: t is time; ACR is the air flow to the room in air changes per second (ACH=3600ACR); C is the thermal capacitance of the room air; $T_S$ is the HVAC supply air temperature; $Q_I$ is the internal heat generation in the room due to occupants, lighting and equipment. The last term represents convection heat transfer between surfaces in the room (walls, furnishing, etc.). $T_W$ is a weighted average temperature of the walls and furnishings in the room; and R is the effective thermal resistance between the walls and furnishings and the room air such that the heat transfer from all of the furnishings/walls to the room air is $(T_W-T)/R$.

The technique is based on making a controlled change in the airflow to the room (ACR changes) at a time when the room temperature is at $T_0$, and analyzing the resulting change of room temperature (such as shown in FIG. 2) for two changes of air flow rate. If it is assumed that $T_W$ remains fairly constant during the test—a good assumption given the much larger thermal mass of the walls and furnishings compared to the room air—then the room air temperature response can be expressed as a first order time constant response:

$$T = T_{SS} + (T_0 - T_S)\exp(-t/\tau) \tag{2}$$

where $T_{SS}$ is a steady state temperature and r is the time constant of the response. These two parameters are given by the equations:

$$\tau = [ACR + 1/(RC)]^{-1} \tag{3a}$$

$$T_{SS} = \tau[Q_I/C + ACR \cdot T_S + T_W/(RC)] \tag{3b}$$

In one embodiment, the procedure involves two sequential operations: (i) increasing the room flow rate by some factor F (i.e., $ACR_i = F \cdot ACR$ where ACR is the original value) until a new steady state temperature is established; and (ii) returning the flow rate to its original value. The time constants can then be determined from the measured temperature response for each of these tests using Equation 1, and the steady state values for the two tests can be measured directly ($T_{SS,i}$ and $T_{SS,ii}$). Using Equation 3a, the resulting time constants from these two tests ($\tau_i$ and $\tau_{ii}$) can be used to find the initial ACR:

$$\frac{1}{\tau_i} - \frac{1}{\tau_{ii}} = [F \cdot ACR + 1/(RC)] - [ACR + 1/(RC)] = (F-1)ACR \tag{4}$$

Once ACR is found from Equation 4, then RC can be found from Equation 3a.

Another way to conduct the system identification experiments to determine the ACR is to change the supply air temperature to the room, $T_S$ in Equation 1, and determine the related time constants from the room air temperature response. This can be done by selective control of the heating coil 36 in the VAV box 22. The experimental protocol is analogous to the procedure described above—the supply air temperature is changed from an initial setting $T_{Si}$ to a new value of $T_{Sii}$ and then back to $T_{Si}$. Equation 3a represents the time constant for both the initial change in $T_S$ from $T_{Si}$ to $T_{Sii}$ and its return back to $T_{Si}$. But the steady state temperatures given by Equation 3b are different, and subtracting the two values yields the following equation, which could be solved for ACR:

$$T_{SS,i} - T_{SS,ii} = \tau[ACR \cdot (T_{S,i} - T_{S,ii})] \tag{5}$$

In practice, both the change of ACR and change of room supply temperature are affected by actuator dynamics in the VAV box 22. The analysis based on Equation 1 can be adjusted to take these factors into account.

The results of the tests can also be used to determine the thermal load, $Q_L$, required to maintain the room at any temperature $T_R$. This thermal load is represented by the last two terms in Equation 1. By using Equation 3b and the steady state temperature for the second test, the thermal load to maintain the room at a temperature $T_R$ can be expressed as:

$$\frac{Q_L(T_R)}{C} = \frac{Q_I}{C} + \frac{T_W - T_R}{RC} = \frac{T_{SS,ii}}{\tau} - \frac{T_R}{RC} - ACR \cdot T_S \tag{6}$$

This load could be met by any combination of supply airflow rate ($ACR_R$) and temperature ($T_{S,R}$) as long as $$ACR_R(T_{S,R} - T_R) = -\frac{Q_L(T_R)}{C} \tag{7}$$

The term $ACR_R \cdot T_{S,R}$ is related to the enthalpy flux that must be provided by the supply air to meet the required load for a room temperature of $T_R$, and it is a convenient form to represent the thermal load, as it is a product of two parameters that are set by the building automation system and therefore provides a basis for building level control. This term can be related to the measured response of the second transient test:

$$ACR_R T_{S,R} = \tag{8}$$

$$ACR_R T_R = \frac{Q_L(T_R)}{C} = \left[ ACR_R + \frac{1}{RC} \right] T_R - \frac{T_{SS,ii}}{\tau} + ACR \cdot T_S$$

It should be noted that the above set of equations can also be written in terms of humidity levels for each room, because once air flow is known, a mass balance can be performed in terms of water levels. This can be used to estimate the resulting humidity levels throughout the building 10.

The method described above assumes that the temperature $T_W$ of the surrounding surfaces (walls, floor and ceiling) remain constant during the test. The method can be extended to the more general case of time-varying wall temperature by use of an additional model-based equation such as the following:

$$\frac{dT_W}{dt} = \frac{T - T_W}{RC_W} + \frac{T_\infty - T_W}{RC_W} \tag{9}$$

which is applied alongside Equation 1. In this equation, $C_W$ is the thermal capacitance of the walls, ceiling and floor; $T_\infty$ represents "neighboring room" temperature outside the walls, ceiling and floor. In the case of a completely interior room, $T_\infty$ may closely correspond to the temperature of one or more neighboring rooms, whereas for peripheral rooms of a building $T_\infty$ may reflect colder or warmer exterior temperatures. The heat transfer to the walls from the room air and the ambient "neighboring room" air is $(T-T_W)/R+(T_\infty-T_W)/R$.

It is noted that Equations 1 and 9 are derived from the following pair of equations:

$$C\frac{dT}{dt} = \dot{m}c_p(T_S - T) + Q_I + \frac{T_W - T}{R} \tag{10}$$

$$C_W \frac{dT_W}{dt} = \frac{T - T_W}{R} + \frac{T_\infty - T_W}{R} \tag{11}$$

where $\dot{m}$ is the mass flow rate of supply air (volumetric flow rate multiplied by density of air) and $c_p$ is the specific heat capacity of air. Since the thermal capacitance C of the room air is the mass of the room air multiplied by the specific heat capacity of air, reordering Equations 10 and 11 results in Equations 1 and 9.

For a situation in which it is assumed that the thermal dynamics of the wall interact with the airflow in the room (i.e., both Equation 1 and Equation 9 are used), the general procedure to calculate the air change rate for a room is based on a) making a change in one of the controllable inputs such as the supply air flow rate (ACR) and/or the supply air temperature ($T_S$), b) measuring the corresponding response of temperature, and c) using an estimator or system identification algorithm based on Equations 1 and 9 to determine the ACR.

There are a number of different approaches that can be used to develop an appropriate estimator/system identification algorithm based on the system equations and measurements. One approach is to directly use the Equations 1 and 9 with standard observer techniques based on finding the parameter values in those model equations that minimize the error of the observed measurements in temperature for different input time series. One such technique is to formulate the problem wherein the unknown parameter, here the air change rate, is formulated as an auxiliary state to be estimated in either a Luenberger or Kalman observer (techniques generally known in the art). This method can be improved by using an analysis technique based on a specific selection of inputs, which can identify unknown parameters such as the R and C terms, and using those values in the observer/parameter ACR estimation model approach.

Another approach is to solve Equations 1 and 9 in terms of their dynamic response as a function of time in terms of an analytical expression for the time dependent exponential terms in terms of parameters in those equations, and then to use the measured value of temperature to obtain a best fit to time constants that characterize the response of the system. One method to determine best fit is to use a least squares error approach to determine the values of the time constants. Using this approach, the basic model of Equations 1 and 9 yields a second order exponential response:

$$T = T_{SS} + \alpha_1 \exp(-t/\tau_1) + \alpha_2 \exp(-t/\tau_2) \tag{12a}$$

$$T_0 = \alpha_1 + \alpha_2 + T_{SS} \tag{12b}$$

In Equation 12a, $\tau_1$ and $\tau_2$ are two coupled time constants, one representing a relatively fast response and the other representing a slower response that are observed and arise due to the interactions between the fast air change rates and the slower thermal response of the walls and other thermal masses in the room. In Equations 12a and 12b, $\alpha_1$ and $\alpha_2$ are the residues associated with time constants $\tau_1$ and $\tau_2$ respectively. These time constants and residues can be related to the ACR and other parameters (see below for example solutions).

Equations 12a and 12b are derived by linearizing Equations 1 and 9 and then taking the standard Laplace transform to form a transfer function. The time constants can be calculated as being dependent on variables R, C and $C_W$ and input parameter ACR, while the steady state room temperature is dependent on variables R and C as well as inputs ACR and $Q_I$.

Although one approach as mentioned above is to use a step change in one of the controllable inputs, other types of changes such as a linear or ramped change over time may be used, or a periodic change such as sinusoidal, triangular, or top-hat variation. In all cases, the room temperature will respond to the change in a manner that is predictable using standard solution methods for ordinary differential equations, given all of the variables (R, C, $C_W$) and input parameters ($T_S$, ACR, $Q_I$, $T_\infty$). This may be referred to as the "forward" problem. System identification is an "inverse" problem, in which the model equations are used to extract the parameter and input changes from a measured temperature response. A variety of SI techniques could be used to accomplish this, including Non-linear Least Square Fits. Among all of these options—what input variable to change, the time variation of the change, and the method used to extract the ACR—there may be some that provide desirably robust and accurate results in any particular application.

Additional complicating factors can be added to the basic model to provide more accurate prediction of the temperature response and thus more accurate extraction of ACR.

In general, the command for an instantaneous change in flow rate or supply air temperature would not yield a true step-change response of the input, due to the dynamics of the actuator used as well as the dampened response of the local control loop associated with the actuator. For example changing the air flow requires a damper to move within the supply air duct, and both the inertia of the damper itself and the local controller gain settings would prevent air flow from changing very quickly. These dynamics can be accounted for by addition of another differential equation.

The basic model assumes that the room air can be treated as a single, isothermal zone. Other models may reflect the existence of two zones, a first zone consisting of the mostly quiescent air that occupies the majority of the room including where occupants are located, and a second zone consisting of the high velocity air from the supply diffuser jet and the air that it entrains from the quiescent zone—this is usually called the primary air zone. This model leads to an additional differential equation for the primary air zone, in addition to equation 1, and a modification to Equation 1 that includes the heat exchanged by the entrainment process (example below).

The room thermostat that is the source of the measure temperature response may also have a dampened response, due to its proximity to the slow responding walls. This may be accounted for by use of yet another differential equation representing the thermal dynamics of the sensor.

For each additional equation added, an additional exponential term with its own time constant is added. The inverse problem for these higher order systems is fundamentally the same as the $2^{nd}$ order system, so the basic System Identification approach can be used, with some variations to extract the additional time constants.

With respect the $2^{nd}$ order case, consider a test in which a step change is made to the ACR at a time when the initial temperature in the room is $T_0$. If it is assumed that $T_\infty$ remains fairly constant during the test, then the room air temperature response can be expressed as a second order time constant response as described by Equations 12a and 12b, where the time constants and steady state temperature are:

$$\tau_1 = \left[\frac{1}{2}\left(ACR + \frac{1}{RC} + \frac{2}{RC_W}\right) - \frac{1}{2}\sqrt{\left(ACR + \frac{1}{RC} + \frac{2}{RC_W}\right)^2 - 4\left(\frac{2ACR}{RC_W} + \frac{1}{RC \cdot RC_W}\right)}\right]^{-1} \quad (13a)$$

$$\tau_2 = \left[\frac{1}{2}\left(ACR + \frac{1}{RC} + \frac{2}{RC_W}\right) + \frac{1}{2}\sqrt{\left(ACR + \frac{1}{RC} + \frac{2}{RC_W}\right)^2 - 4\left(\frac{2ACR}{RC_W} + \frac{1}{RC \cdot RC_W}\right)}\right]^{-1} \quad (13b)$$

$$T_{SS} = \left[\frac{1}{2RC} + ACR\right]^{-1} \cdot \left[\frac{Q_I}{C} + ACR \cdot T_S + \frac{T_\infty}{2RC}\right] \quad (13c)$$

In general the process is to determine the time constants ($\tau_1$ and $\tau_2$) and associated residues ($\alpha_1$ and $\alpha_2$) from a regression analysis by fitting the measured temperature response to a change in supply air flow to Equation 12a. The steady state temperature ($T_{SS}$) is either measured directly or else determined by regression analysis. An example of regression analysis employs the MATLAB® Curve Fitting Tool using a Trust-Region algorithm.

Method A: Changing the Supply Mass Flow Rate into the Room and Corresponding ACR to Zero, and then Returning to the Initial Mass Flow Rate In one embodiment, the procedure involves the same two sequential operations as were described for the previous method. A first step, Step i, which has two time constants $\tau_{1,i}$ and $\tau_{2,i}$, decreasing the room flow rate to zero (i.e., $ACR_i$=0) until a new steady state temperature is established; and a second step, Step ii, which has two time constants $\tau_{1,ii}$ and returning the flow rate to its original value (i.e., ACR). The time constants can then be determined from the measured temperature response for each of these tests using Equation 12a and the steady state values for the two tests can be measured directly ($T_{SS,i}$ and $T_{SS,ii}$) or else determined by regression analysis of the dynamic temperature response.

The resulting time constants from these two tests ($\tau_{1,i}$, $\tau_{1,ii}$, $\tau_{2,i}$ and $\tau_{2,ii}$) can be used to find the initial ACR by utilizing equations 13a and 13b:

$$\left(\frac{1}{\tau_{1,ii}} + \frac{1}{\tau_{2,ii}}\right) - \left(\frac{1}{\tau_{1,i}} + \frac{1}{\tau_{2,i}}\right) = \left[ACR + \frac{1}{RC} + \frac{2}{RC_W}\right] - \left[\frac{1}{RC} + \frac{2}{RC_W}\right] = ACR \quad (14)$$

Once ACR is found from Equation 14, one can directly obtain the values for RC and $RC_W$ by examining the time constants associated with the change to zero air flow rate:

$$\frac{1}{RC} = \frac{2}{2\tau_{1,i}} + \frac{1}{2\tau_{2,i}} + \frac{1}{2}\sqrt{\left(\frac{1}{\tau_{1,i}}\right)^2 + \left(\frac{1}{\tau_{2,i}}\right)^2 - \frac{6}{\tau_{1,i}\tau_{2,i}}} \quad (15)$$

$$\frac{2}{RC_W} = \frac{1}{2\tau_{1,i}} + \frac{1}{2\tau_{2,i}} - \frac{1}{2}\sqrt{\left(\frac{1}{\tau_{1,i}}\right)^2 + \left(\frac{1}{\tau_{2,i}}\right)^2 - \frac{6}{\tau_{1,i}\tau_{2,i}}} \quad (16)$$

Method B: Determining ACR from a Single Step Change from One Level to Another Using Time Constants and Residues for the Air/Wall Model It is also possible to determine ACR, $RC_W$ and RC by applying a single change in air flow rate and determining the coefficients $\alpha_1$, $\alpha_2$, $\tau_1$ and $\tau_2$ from Equation 12a for the temperature response of the room from:

$$\frac{2}{RC_W} = \left(\frac{\alpha_1 + \alpha_2}{\tau_1 \cdot \tau_2}\right) / \left(\frac{\alpha_1}{\tau_1} + \frac{\alpha_2}{\tau_2}\right) \quad (17)$$

Once $RC_W$ is determined, ACR can be extracted:

$$ACR = \left[\left(\frac{1}{\tau_1} + \frac{1}{\tau_2} - \frac{2}{RC_W}\right)^2 + \left(\frac{2}{RC_W}\right)^2 - \left(\frac{1}{\tau_1} - \frac{1}{\tau_2}\right)^2\right] / \frac{4}{RC_W} \quad (18)$$

And finally, RC can be extracted:

$$\frac{1}{RC} = -ACR + \sqrt{2ACR \cdot \frac{2}{RC_W} - \left(\frac{2}{RC_W}\right)^2 + \left(\frac{1}{\tau_1} - \frac{1}{\tau_2}\right)^2} \quad (19)$$

Method C: Changing the Supply Mass Flow Rate into the Room and Corresponding ACR to a Value Greater than Zero, and then Returning to the Initial Mass Flow Rate In one embodiment, the procedure involves the same two sequential operations as described above for the first method (in which the thermal dynamics of the wall do not interact with the airflow in the room): (i) increasing the room flow rate by some factor F (i.e., $ACR_i = F \cdot ACR$ where ACR is the original value) until a new steady state temperature is established; and (ii) returning the flow rate to its original value.

The resulting time constants ($\tau_{1,i}$, $\tau_{1,ii}$, $\tau_{2,i}$ and $\tau_{2,ii}$) from the two tests can be used to find the initial ACR by utilizing Equations 13a and 13b:

$$\left(\frac{1}{\tau_{1,i}} + \frac{1}{\tau_{2,i}}\right) - \left(\frac{1}{\tau_{1,ii}} + \frac{1}{\tau_{2,ii}}\right) = \quad (20)$$
$$\left[F \cdot ACR + \frac{1}{RC} + \frac{2}{RC_W}\right] - \left[ACR + \frac{1}{RC} + \frac{2}{RC_W}\right] = (F-1)ACR$$

It is also possible to use multiple different inputs and/or multiple methods together (i.e., using Method A and Method B) to obtain different measures of the air change rate. For example, one can apply Method B with different or similar multiple step changes in supply air flow to obtain either a better overall estimate of the system or an assessment of the robustness of the measurements. The different determined values can be used to obtain a better overall average, and also to assess the robustness of the test itself i.e., if the values are quite different, then it may suggest that one or both of the step-change experiments were compromised due to sensor issues, changing conditions in the room (change in heat load), supply air leakage or a varying supply air temperature during the test.

Another way to conduct the system identification experiments to determine the ACR is to change the supply air temperature to the room, $T_S$ in Equation 1, and determine the related time constants from the room air temperature response. This can be done by selective control of the heating coil 36 in the VAV box 22. The experimental protocol is analogous to the procedure described above—the supply air temperature is changed from an initial setting $T_{Si}$ to a new value of $T_{Sii}$ and then back to $T_{Si}$. Equations 13a and 13b represent the time constants for both the initial change in $T_S$ from $T_{Si}$ to $T_{Sii}$ and its return back to $T_{Si}$. The steady state temperatures given by Equation 13c is different in this case, and subtracting the two values yields the following equation which can be solved for ACR:

$$T_{SS,i} - T_{SS,ii} = [1/(2RC) + ACR]^{-1} \cdot [ACR \cdot (T_{S,i} - T_{S,ii})] \quad (21)$$

In practice, both the change of ACR and change of room supply temperature are affected by actuator dynamics in the VAV box 22. The analysis based on Equations 1 and 9 can be adjusted to take these factors into account.

The results of the tests can also be used to determine the thermal load, $Q_L$, required to maintain the room at any temperature $T_R$. This thermal load is represented by the last two terms in Equation 1, and by using Equation 13c and the steady state temperature for the second test, the thermal load to maintain the room at a temperature $T_R$ can be expressed as:

$$\frac{Q_L(T_R)}{C} = \quad (22)$$
$$\frac{Q_I}{C} + \frac{\frac{1}{2}(T_R + T_\infty) - T_R}{RC} = T_{SS,ii}\left(\frac{1}{2RC} + ACR\right) - \frac{T_R}{2RC} - ACR \cdot T_S$$

This load could be met by any combination of supply airflow rate $ACR_R$ and temperature $T_{S,R}$ as long as $$ACR_R(T_{S,R} - T_R) = -\frac{Q_L(T_R)}{C} \quad (23)$$

The term $ACR_R \cdot T_{S,R}$ is related to the enthalpy flux that must be provided by the supply air to meet the required load for a room temperature of $T_R$, and it is a convenient form to represent the thermal load, as it is a product of two parameters that are set by the building automation system and therefore provides a basis for building level control. This term can be related to the measured response of the second transient test:

$$ACR_R T_{S,R} = ACR_R T_R - \quad (24)$$
$$\frac{Q_L(T_R)}{C} = \left[ACR_R + \frac{1}{2RC}\right]T_R - \left[ACR + \frac{1}{2RC}\right]T_{SS,ii} + ACR \cdot T_S$$

It should be noted that the above set of equations can also be written in terms of humidity levels for each room, because once air flow is known, a mass balance can be performed in terms of water levels. This can be used to estimate the resulting humidity levels throughout the building 10.

The following describes several important features and potential applications of the disclosed technique:
  Use of a physical-based model in combination with controlled transient experiments to determine air change rates, and thermal loads, and humidity levels.
  Use of a form of the governing equations that allows direct determination of the air change rates without the need for any details of room dimensions.
  Deriving or estimating actual air flow rates into each room, enabling identification of minimum air flow settings for each room and/or VAV box that serves one or more rooms. The actual data can be compared to the minimum required flow and/or air change rates required for ventilation, and a new minimum level can be determined and used to reprogram the VAV box controller.

Confirming the actual air flow rates in new buildings as part of a commissioning procedure, or to identify which VAV boxes and/or controllers are not functioning properly. In both cases, this avoids the requirement to manually test each VAV box.

Providing a basis for optimizing the conditions of how the main air handler units are operated in terms of deciding what the air supply temperature set point should be adjusted to in order to minimize HVAC system energy use and/or cost.

The following describes several advantages of the disclosed technique:

It focuses specifically on airflow, a key driver of energy costs in most commercial HVAC systems.

It provides a means of reducing energy costs without major capital investment by relating actual airflow settings to minimum requirements to achieve required ventilation levels.

It captures the critical physics associated with room thermal loads and transient response, using a simplified, but effective, thermal model of individual rooms. This information can be used to optimize system level control in terms of static pressure reset, set point for supply air temperature and pressure, and settings of VAV damper positions.

It uses existing building automation system sensors, so it requires no additional equipment.

It provides thermal loads in a convenient form for interfacing with building automation software, allowing aggregation of room-by-room behavior to enable a system-level optimization i.e., minimizing energy use/cost while ensuring all performance objectives (ventilation, heating, cooling, and dehumidification) are met.

It is based on dynamic rather than steady state system identifications, allowing for faster room-by-room characterization tests that minimize disruption to occupants while capturing critical load and airflow information as well as transient behavior.

It enables optimized commissioning, optimized adaptive control, and system monitoring to identify equipment failures and the need for future rebalancing.

It can be implemented as an algorithm that can be automatically run through the building automation software.

The following describes potential embodiments of the disclosed technique:

Using a software module for integration into existing building automation software, to be sold to building owners and operators used for monitoring system performance and optimizing supply air temperature and pressure set points.

Use as a commissioning tool for new building to confirm actual room-by-room VAV box performance.

Use as recommissioning tool for existing buildings to optimize both individual VAV settings and Air handler unit control, as well as monitoring building performance.

The following describes possible variations of the disclosed technique:

Include humidity measurements and determination of humidity loads.

Include actuator dynamics (such as damper in VAV box), and other inputs to the system to conduct the system identification, such as room inlet supply temperature (such as by opening local reheat valve in the local VAV box). To implement this, one can use standard system identification techniques, where one includes a model of the actuator, and the unknown parameters of the actuator dynamics are identified along with the air change rate parameters described above. This could be done by writing both the room temperature state equations down as well as the actuator dynamics, and using the system identification algorithms to identify the parameters in both equations, or through numerically identifying the time constants from the dynamic response, and identifying which time constant corresponds to which process (i.e. either the actuator dynamics or the air change dynamics). In some cases, in may be desirable to change both the air flow rate as well as the supply temperature in order to explicitly identify both the actuator dynamics and the air change rate or air flow rate.

Use in constant flow systems, enabling determination of nominal air flow rates and air change rates for individual spaces. The experimental system identification procedure would be based on change building supply air flow rate and/or supply temperature, and monitoring the room by room dynamic thermal response. This information can be used to reset the overall flow rate for the whole building, as well as local dampers for specific rooms.

Using a wireless temperature sensor located in or near the exit of the exhaust air stream for the room, in place of or in addition to using a conventional room thermostat. This may provide more consistent results from room-to-room and also allow the method to be extended to rooms that do not have a thermostat.

In a similar fashion, a wireless temperature sensor could also be placed in or at near the exit of the supply air duct for the room to monitor any changes to supply air temperature during the test.

Instead of using a single test for each room, a series of tests, with identical changes in flow rate or supply air temperature, could be employed. Each set of test results would preferably be normalized using an equation such as the following:

$$\theta = \frac{T - T_0}{T_{SS} - T_0}$$

The normalized responses for the ensemble of tests may be averaged, and the resulting ensemble average used as input to the algorithm. In this way, small random effects due to errors in measurements or unexpected HVAC system control responses would be averaged out.

Employ a two-zone room model instead of the one zone lumped model implicit in Equation 1. One of the zones is the mostly quiescent air that occupies the majority of the room including where occupants are located. The second zone represents the high velocity air from the supply diffuser jet and the air that it entrains from the quiescent zone; this is usually called the primary air zone. This model leads to an additional equation for the primary air zone, in addition to Equation 1, and a modification to Equation 1a that include the heat exchanged by the entrainment process:

$$\frac{dT_1}{dt} = ACR_1(T_S - T_1) + x \cdot ACR_2(T_2 - T_1) + \frac{T_{w,1} - T_1}{R_1 C_1} + \frac{Q_{l,1}}{C_1} \quad (25)$$

$$\frac{dT_2}{dt} = ACR_2(T_1 - T_2) + \frac{T_{w,2} - T_2}{R_2 C_2} + \frac{Q_{l,2}}{C_2} \qquad (26)$$

where the factors with a subscript 1 are representative of the primary air zone, and factors with a subscript 2 are representative of the occupied zone of the room, and x represents the fraction of air from the occupied zone which is entrained by the primary air zone. This leads to a $3^{rd}$ order solution rather than the $2^{nd}$ order solution described above, but the air flow rates can still be extracted from the measured temperature response using a modified version of the algorithm.

While various embodiments of the invention have been particularly shown and described, it will be understood by those skilled in the art that various changes in form and details may be made therein without departing from the scope of the invention as defined by the appended claims.

What is claimed is:

1. A method for estimating an air change rate of a room of a building using heating, ventilation and air conditioning (HVAC) equipment supplying conditioned air to the room, comprising:
    monitoring temperature of the room;
    making one or more changes to air flow rate and/or supply temperature of the conditioned air supplied to the room; and
    determining an air change rate of the room using a response of the temperature of the room to the one or more changes,
    wherein determining the air change rate includes performing a model-based mathematical calculation including one or more first-order differential equations for a relationship between a time rate of change of room air temperature and the air change rate,
    and wherein the model-based mathematical calculation includes a contribution to the time rate of change of room air temperature from a wall temperature of one or more of walls, ceiling and floor of the room.

2. A method according to claim 1, wherein the model-based mathematical calculation includes a first-order differential equation establishing the contribution as a relationship between the time rate of change of the wall temperature and one or more other factors including change of air temperature, wall temperature, neighboring room temperature, and other heat sources.

3. A method according to claim 1, wherein the changes to the air supplied to the room include one or more changes to an air flow rate of the air supplied to the room.

4. A method according to claim 3, wherein the changes to the air flow rate are effected by controlling a damper of a variable air volume unit located at a supply entrance to the room.

5. A method according to claim 1, wherein the changes to the air supplied to the room include one or more changes to supply temperature of the air supplied to the room.

6. A method according to claim 5, wherein the changes to the air flow rate are effected by controlling a heating element of a variable air volume unit located at a supply entrance to the room.

7. A method according to claim 1, wherein making the changes includes commanding an instantaneous change in the air flow rate and/or supply temperature of the conditioned air.

8. A method according to claim 1, wherein making the changes includes changing the air flow rate and/or supply temperature of the conditioned air by a linear or ramped change over time.

9. A method according to claim 1, wherein determining the air change rate specifically accounts for dynamic mechanical behavior of one or more mechanical components of the HVAC equipment, including delay from a time that a change to the supply air is commanded to a time that the change to the supply air actually occurs.

10. A method according to claim 1, wherein monitoring temperature of the room includes use of a sensing device in the room or monitoring temperature of exhaust air from the room.

11. A method according to claim 1, wherein determining the air change rate of the room includes using one or more time constants of the response of the temperature of the room.

12. A method according to claim 1, wherein determining the air change rate of the room includes using one or more steady states of the response of the temperature of the room.

13. A method according to claim 1, wherein determining the air change rate of the room includes using one or more residues of the response of the temperature of the room.

14. A method according to claim 11, including use of a system to determine the time constants.

15. A method according to claim 1 for estimating a thermal load of a room, comprising:
    performing the method of claim 1 to determine the air change rate of the room; and
    determining the thermal load using the determined air change rate.

16. A method according to claim 1 for controlling air flow into a room, comprising:
    performing the method of claim 1 to determine the air change rate of the room;
    using the determined air change rate to determine a minimal air change rate minimizing an amount of energy required to maintain the desired temperature of the room; and
    using the minimal air change rate to control temperature and flow rate of the air supplied to the room.

17. A method according to claim 1 for controlling air flow into a set of rooms of a building, the air flow provided by a heating, ventilation and air conditioning (HVAC) system under single control for all the rooms, comprising:
    performing the method of claim 1 for each of the rooms to determine respective air change rates of the rooms;
    using the determined respective air change rates of the rooms to determine minimum air flow rates to maintain desired temperatures of the rooms; and
    using the determined minimum air flow rates to determine set points for flow rates of the air supplied by the HVAC system to each of the rooms.

* * * * *